(12) United States Patent
Insley et al.

(10) Patent No.: US 8,090,810 B1
(45) Date of Patent: Jan. 3, 2012

(54) CONFIGURING A REMOTE MANAGEMENT MODULE IN A PROCESSING SYSTEM

(75) Inventors: Mark W. Insley, Sunnyvale, CA (US);
Pradeep Kalra, San Jose, CA (US);
Peter Snyder, Menlo Park, CA (US);
Dan H. Gilson, III, San Jose, CA (US);
Mitalee Gujar, Santa Clara, CA (US)

(73) Assignee: NetApp, Inc., Sunnyvale, CA (US)

( * ) Notice: Subject to any disclaimer, the term of this patent is extended or adjusted under 35 U.S.C. 154(b) by 474 days.

(21) Appl. No.: 11/074,229

(22) Filed: Mar. 4, 2005

(51) Int. Cl.
*G06F 15/16* (2006.01)

(52) U.S. Cl. ........ 709/223; 709/224; 709/226; 709/227; 709/229

(58) Field of Classification Search .......... 709/223–225, 709/217, 229
See application file for complete search history.

(56) References Cited

U.S. PATENT DOCUMENTS

| | | | |
|---|---|---|---|
| 4,670,880 A | 6/1987 | Jitsukawa et al. | |
| 5,241,549 A | 8/1993 | Moon et al. | |
| 5,555,438 A | 9/1996 | Blech et al. | |
| 5,664,101 A | 9/1997 | Picache | |
| 5,761,683 A | 6/1998 | Logan et al. | |
| 5,815,652 A | 9/1998 | Ote et al. | |
| 5,822,514 A | 10/1998 | Steinz et al. | |
| 5,881,078 A | 3/1999 | Hanawa et al. | |
| 6,170,067 B1 | 1/2001 | Liu et al. | |
| 6,195,353 B1 | 2/2001 | Westberg | |
| 6,216,226 B1 | 4/2001 | Agha et al. | |
| 6,237,103 B1 | 5/2001 | Lam et al. | |
| 6,253,300 B1 | 6/2001 | Lawrence et al. | |
| 6,275,526 B1 | 8/2001 | Kim et al. | |
| 6,335,967 B1 | 1/2002 | Blomkvist et al. | |
| 6,446,141 B1 | 9/2002 | Nolan et al. | |
| 6,480,850 B1 | 11/2002 | Veldhuisen | |
| 6,502,088 B1 | 12/2002 | Gajda et al. | |
| 6,502,208 B1 | 12/2002 | McLaughlin et al. | |
| 6,507,929 B1 | 1/2003 | Durham et al. | |
| 6,574,518 B1 | 6/2003 | Lounsberry et al. | |
| 6,586,911 B1 | 7/2003 | Smith | |
| 6,645,077 B2 | 11/2003 | Rowe | |
| 6,651,190 B1 | 11/2003 | Worley et al. | |
| 6,690,733 B1 | 2/2004 | Baumgartner et al. | |
| 6,697,962 B1 | 2/2004 | McCrory et al. | |
| 6,728,908 B1 | 4/2004 | Fukuhara et al. | |
| 6,920,502 B2 * | 7/2005 | Araujo et al. | ......... 709/229 |

(Continued)

FOREIGN PATENT DOCUMENTS

EP 0 621 706 10/1994

(Continued)

OTHER PUBLICATIONS

Phillips Semiconductors, The I2C Bus Specification, Jan. 2000, Version 2.1-2000, pp. 6, 7,10, 13-15.
PCT International Search Report and Written Opinion for PCT/US2006/007287; Intl Filng Date: Feb. 28, 2006; Mailing Date: Jul. 6, 2006 (11 pages).

(Continued)

*Primary Examiner* — Jeffrey Pwu
*Assistant Examiner* — Sulaiman Nooristany
(74) *Attorney, Agent, or Firm* — Perkins Coie LLP (57) ABSTRACT

A remote management module (RMM) can be configured, in one embodiment, via the processing system that the RMM is monitoring. In one embodiment, the present invention includes allowing a user access to a processing system being monitored by a RMM, and configuring the RMM without the user accessing the RMM.

20 Claims, 8 Drawing Sheets

U.S. PATENT DOCUMENTS

| | | | |
|---|---|---|---|
| 6,925,531 B2 | 8/2005 | Konshak et al. | |
| 6,976,058 B1 | 12/2005 | Brown et al. | |
| 7,003,563 B2* | 2/2006 | Leigh et al. | 709/223 |
| 7,024,551 B2* | 4/2006 | King et al. | 713/2 |
| 7,114,102 B2* | 9/2006 | Chan et al. | 714/37 |
| 7,225,327 B1 | 5/2007 | Rasmussen et al. | |
| 7,234,051 B2 | 6/2007 | Munguia et al. | |
| 7,257,741 B1 | 8/2007 | Palenik et al. | |
| 7,466,713 B2 | 12/2008 | Saito | |
| 7,487,343 B1 | 2/2009 | Insley et al. | |
| 7,584,337 B2 | 9/2009 | Rowan et al. | |
| 7,805,629 B2 | 9/2010 | Insley et al. | |
| 7,899,680 B2 | 3/2011 | Insley et al. | |
| 2001/0056483 A1 | 12/2001 | Davis | |
| 2002/0059627 A1* | 5/2002 | Islam et al. | 725/96 |
| 2002/0078231 A1 | 6/2002 | Chang et al. | |
| 2002/0129305 A1 | 9/2002 | Ahrens et al. | |
| 2002/0133581 A1 | 9/2002 | Schwartz et al. | |
| 2002/0156840 A1 | 10/2002 | Ulrich et al. | |
| 2003/0008805 A1 | 1/2003 | Honma et al. | |
| 2003/0033361 A1 | 2/2003 | Garnett et al. | |
| 2003/0061320 A1* | 3/2003 | Grover et al. | 709/222 |
| 2003/0088655 A1 | 5/2003 | Leigh et al. | |
| 2003/0088805 A1 | 5/2003 | Majni et al. | |
| 2003/0135748 A1* | 7/2003 | Yamada et al. | 713/193 |
| 2003/0163651 A1 | 8/2003 | Jain et al. | |
| 2003/0200266 A1 | 10/2003 | Henry | |
| 2004/0064731 A1 | 4/2004 | Nguyen et al. | |
| 2004/0093592 A1 | 5/2004 | Rao | |
| 2004/0133643 A1 | 7/2004 | Warren et al. | |
| 2004/0136720 A1 | 7/2004 | Mahowald et al. | |
| 2004/0177178 A1 | 9/2004 | Gregg et al. | |
| 2004/0215948 A1 | 10/2004 | Abbey et al. | |
| 2004/0250072 A1* | 12/2004 | Ylonen | 713/170 |
| 2005/0021722 A1* | 1/2005 | Metzger | 709/223 |
| 2005/0033952 A1* | 2/2005 | Britson | 713/2 |
| 2005/0044170 A1* | 2/2005 | Cox et al. | 709/217 |
| 2005/0044207 A1* | 2/2005 | Goss et al. | 709/224 |
| 2005/0125118 A1* | 6/2005 | Chalker et al. | 701/33 |
| 2005/0129035 A1 | 6/2005 | Saito | |
| 2005/0144493 A1 | 6/2005 | Cromer et al. | |
| 2005/0165989 A1 | 7/2005 | Kim | |
| 2005/0188071 A1* | 8/2005 | Childress et al. | 709/223 |
| 2005/0193021 A1 | 9/2005 | Peleg | |
| 2005/0193182 A1* | 9/2005 | Anderson et al. | 711/163 |
| 2005/0283606 A1 | 12/2005 | Williams | |
| 2005/0288828 A1 | 12/2005 | Claseman | |
| 2005/0289548 A1 | 12/2005 | Farchi et al. | |
| 2006/0039468 A1 | 2/2006 | Emerson et al. | |
| 2006/0095224 A1 | 5/2006 | Lambert | |
| 2006/0156054 A1* | 7/2006 | Brown et al. | 714/4 |
| 2006/0179184 A1 | 8/2006 | Fields et al. | |
| 2006/0200471 A1 | 9/2006 | Holland et al. | |

FOREIGN PATENT DOCUMENTS

| | | |
|---|---|---|
| JP | 58181395 | 10/1983 |
| WO | WO-03023561 | 3/2003 |

OTHER PUBLICATIONS

PCT International Search Report and Written Opinion for PCT/US2006/007231, Int'l filing date: Feb. 28, 2006; Mailing date: Aug. 8, 2006 (10 pages).

Office Action in U.S. Appl. No. 11/073,342; mailed Dec. 3, 2009.

Co-pending U.S. Appl. No. 11/073,342, filed Mar. 4, 2005.

Co-pending U.S. Appl. No. 11/073,045, filed Mar. 4, 2005.

Co-pending U.S. Appl. No. 11/073,293, filed Mar. 4, 2005.

Co-pending U.S. Appl. No. 11/073,260, filed Mar. 4, 2005.

Non-Final Office Action mailed Dec. 3, 2009 in Co-pending U.S. Appl. No. 11/073,342, filed Mar. 4, 2005.

Final Office Action mailed Jul. 23, 2009 in Co-pending U.S. Appl. No. 11/073,342, filed Mar. 4, 2005.

Non-Final Office Action mailed Dec. 17, 2008 in Co-pending U.S. Appl. No. 11/073,342, filed Mar. 4, 2005.

Non-Final Office Action mailed Jul. 2, 2008 in Co-pending U.S. Appl. No. 11/073,342, filed Mar. 4, 2005.

Notice of Allowance mailed Dec. 31, 2009 in Co-pending U.S. Appl. No. 11/073,045, filed Mar. 4, 2005.

Non-Final Office Action mailed Jul. 6, 2009 in Co-pending U.S. Appl. No. 11/073,045, filed Mar. 4, 2005.

Final Office Action mailed Feb. 19, 2009 in Co-pending U.S. Appl. No. 11/073,045, filed Mar. 4, 2005.

Non-Final Office Action mailed Aug. 19, 2008 in Co-pending U.S. Appl. No. 11/073,045, filed Mar. 4, 2005.

Final Office Action mailed Apr. 11, 2008 in Co-pending U.S. Appl. No. 11/073,045, filed Mar. 4, 2005.

Non-Final Office Action mailed Dec. 7, 2007 in Co-pending U.S. Appl. No. 11/073,045, filed Mar. 4, 2005.

Notice of Allowance Mailed Oct. 28, 2008 in Co-pending U.S. Appl. No. 11/073,260, filed Mar. 4, 2005.

Notice of Allowance Mailed Jul. 15, 2008 in Co-pending U.S. Appl. No. 11/073,260, filed Mar. 4, 2005.

Non-Final Office Action Mailed Feb. 5, 2008 in Co-pending U.S. Appl. No. 11/073,260, filed Mar. 4, 2005.

Non-Final Office Action Mailed Jul. 26, 2007 in Co-pending U.S. Appl. No. 11/073,260, filed Mar. 4, 2005.

Non-Final Office Action Mailed Sep. 28, 2009 in Co-pending U.S. Appl. No. 11/073,293, filed Mar. 4, 2005.

Notice of Allowance mailed Mar. 1, 2010 Co-pending U.S. Appl. No. 11/073,045, filed Mar. 4, 2005.

Final Office Action mailed May 26, 2010 in Co-Pending U.S. Appl. No. 11/073,342, filed Mar. 4, 2005.

Non-Final Office Action mailed May 26, 2010 in Co-Pending U.S. Appl. No. 11/073,293, filed Mar. 4, 2005.

Notice of Allowance Mailed Jul. 20, 2010 in Co-Pending U.S. Appl. No. 11/073,045, filed Mar. 4, 2005.

Non-Final Office Action Mailed Mar. 10, 2011 in Co-Pending U.S. Appl. No. 11/073,342, filed Mar. 4, 2005.

PCT International Search Report and Written Opinion for PCT/US2006/007231, Int'l filing date: Feb. 28, 2006; Mailing date: Aug. 7, 2006 (10 pages).

Kistler, M. et al., "Console over Ethernet", IBM (2003) pp. 1-16.

Notice of Allowance Mailed Nov. 15, 2010 in Co-pending U.S. Appl. No. 11/073,293, filed Mar. 4, 2005.

* cited by examiner

CONFIGURING A REMOTE MANAGEMENT MODULE IN A PROCESSING SYSTEM

FIELD OF THE INVENTION

At least one embodiment of the present invention pertains to remote management of a processing system and more particularly, to configuring a remote management module in a processing system.

BACKGROUND

In many types of computer networks, it is desirable to be able to perform certain management related functions on processing system from a remote location. For example, a business enterprise may operate a large computer network that includes numerous client and server processing systems (hereinafter "clients" and "servers", respectively). With such a network, it may be desirable to allow a network administrator to perform or control various functions on the clients and/or servers from a remote console via the network, such as monitoring various functions and conditions in these devices, configuring the devices, performing diagnostic functions, debugging, software upgrades, etc. To facilitate explanation, such functions are referred to collectively and individually as "management functions".

One particular application in which it is desirable to have this capability is in a storage-oriented network, i.e., a network that includes one or more storage servers that store and retrieve data on behalf of one or more clients. Such a network may be used, for example, to provide multiple users with access to shared data or to backup mission critical data. An example of such a network is illustrated in FIG. 1.

Figure 1:
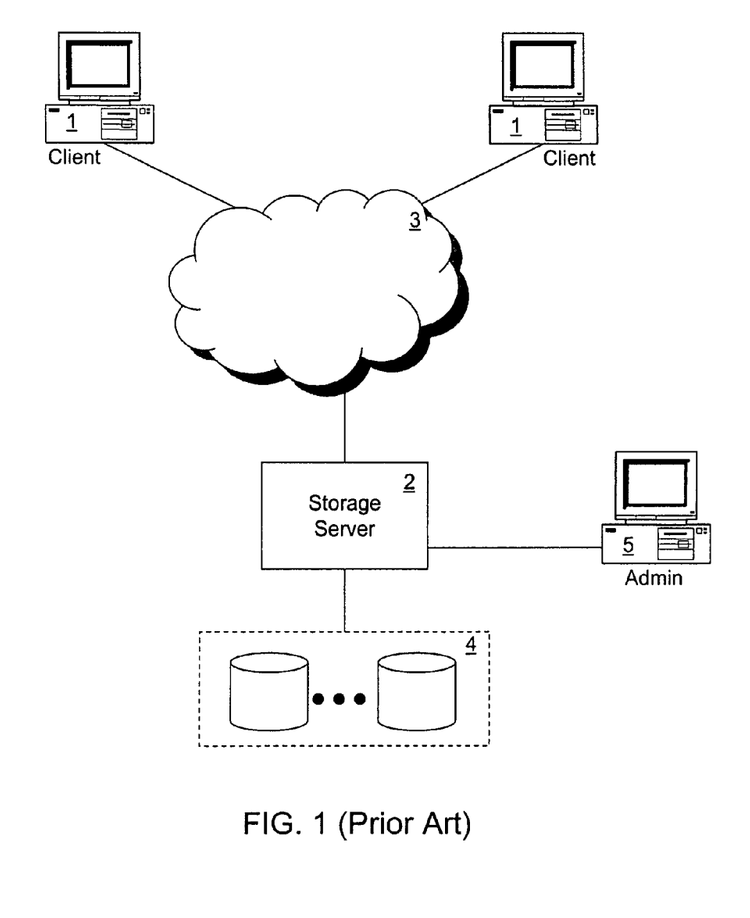
FIG. 1 illustrates a network environment which includes a storage server managed from an administrative console.

In FIG. 1, a storage server 2 is coupled locally to a storage subsystem 4, which includes a set of mass storage devices, and to a set of clients 1 through a network 3, such as a local area network (LAN) or wide area network (WAN). The storage server 2 operates on behalf of the clients 1 to store and manage shared files or other units of data (e.g., blocks) in the set of mass storage devices. Each of the clients 1 may be, for example, a conventional personal computer (PC), workstation, or the like. The storage subsystem 4 is managed by the storage server 2. The storage server 2 receives and responds to various read and write requests from the clients 1, directed to data stored in, or to be stored in, the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. The mass storage devices may be organized into one or more volumes of Redundant Array of Inexpensive Disks (RAID).

Also shown in FIG. 1 is an administrative console 5 coupled to the storage server 2. The storage server 2 in this configuration includes a serial port (e.g., RS-232) and appropriate software to allow direct communication between the storage server 2 and the administrative console 5 through a transmission line. This configuration enables a network administrator to perform at least some of the types of management functions mentioned above on the storage server 2. Filer products made by Network Appliance, Inc. of Sunnyvale, Calif., are an example of storage servers which has this type of capability.

In the illustrated configuration, the administrative console 5 must be directly coupled to the storage server 2 and must be local to the storage server 2. This limitation is disadvantageous, in that it may be impractical or inconvenient to locate the administrative console 5 close to the storage server 2. Further, this configuration makes it difficult or impossible to use the same administrative console to manage multiple devices on a network.

Technology does exist to enable management functions to be performed on a computer system remotely via a network. In one approach, a device known as a remote management module (RMM) is incorporated into a processing system to enable remote management of the processing system (referred to as the "host" processing system) via a network. The RMM is also referred to as a service processor or remote management card; and in this application the term RMM is used interchangeably with the term service processor. The RMM is often in the form of a dedicated circuit card separate from the other elements of the host processing system. The RMM normally has a network interface that connects to the network and a separate internal interface that connects to one or more components of the processing system.

One shortcoming of known RMM technology is that the RMM needs to be configured separately from the processing system. This is inefficient, as a user would need to perform two separate initializations and possess two sets of credentials, one for the processing system and one for the RMM. Hence, it would be desirable to have a simple unified configuration system for the RMM.

SUMMARY OF THE INVENTION

A remote management module (RMM) can be configured, in one embodiment, via the processing system that the RMM is monitoring. In one embodiment, the present invention includes allowing a user access to a processing system being monitored by a RMM, and configuring the RMM without the user accessing the RMM.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for a simple unified configuration system for an RMM are described. The technique introduced herein enables an RMM installed in a processing system to be configured simultaneously with the processing system, such that the network administrator does not have to separately configure the RMM.

Remote Management Module

Figure 2:
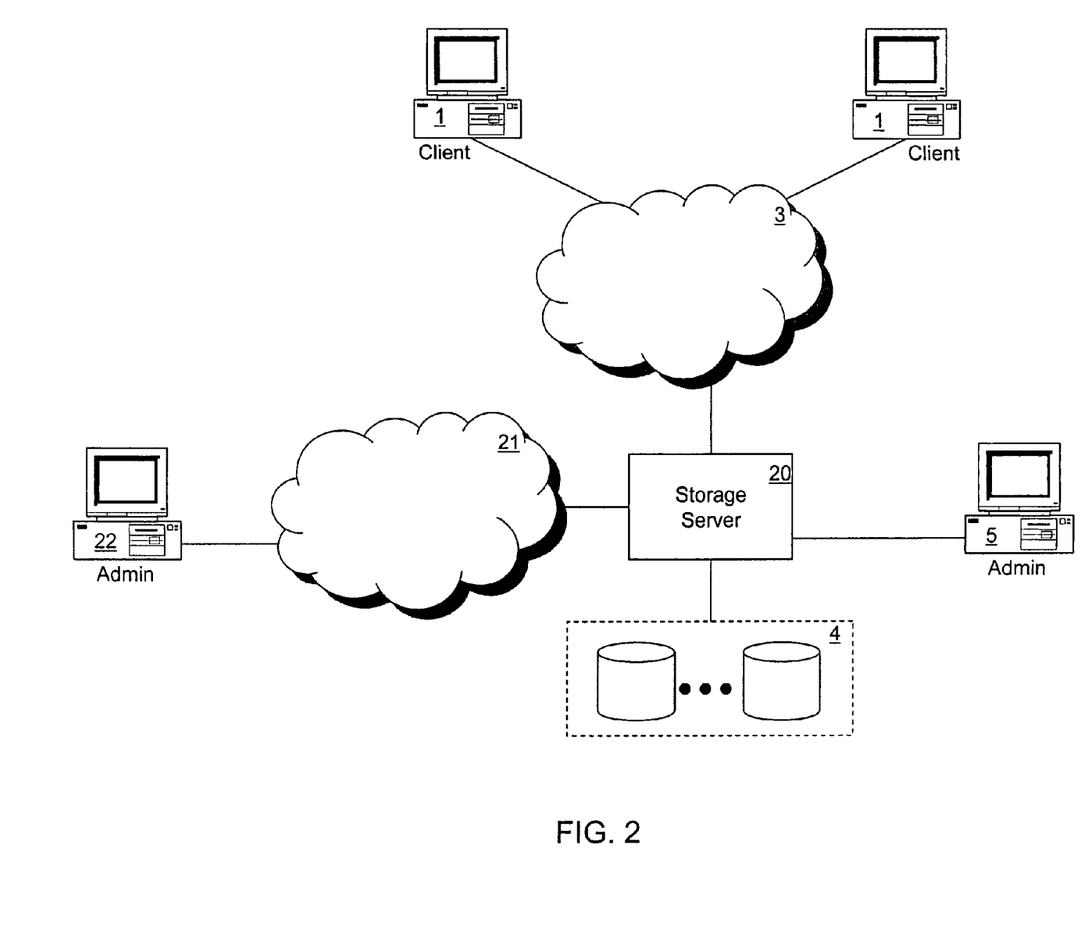
FIG. 2 illustrates a network environment which includes a storage server that can be managed remotely from an administrative console over a network.

An example of a network configuration in which various embodiments of the present invention can be employed is shown in FIG. 2. It is assumed, for purposes of this description, that the processing system to be remotely managed is a storage server 20; however, it will be recognized that the technique introduced herein can also be applied to essentially any other type of network-connected processing system, such as standard personal computers (PCs), workstations, servers other than storage servers, etc. The configuration of FIG. 2 is similar to that of FIG. 1, except that the storage server 20 can be managed through a network 21 from a remote administrative console 22, in addition to being capable of being managed through the direct serial interface. Note that while network 3 and network 21 are depicted as separate networks in FIG. 2, they can be the same network.

Figure 3:
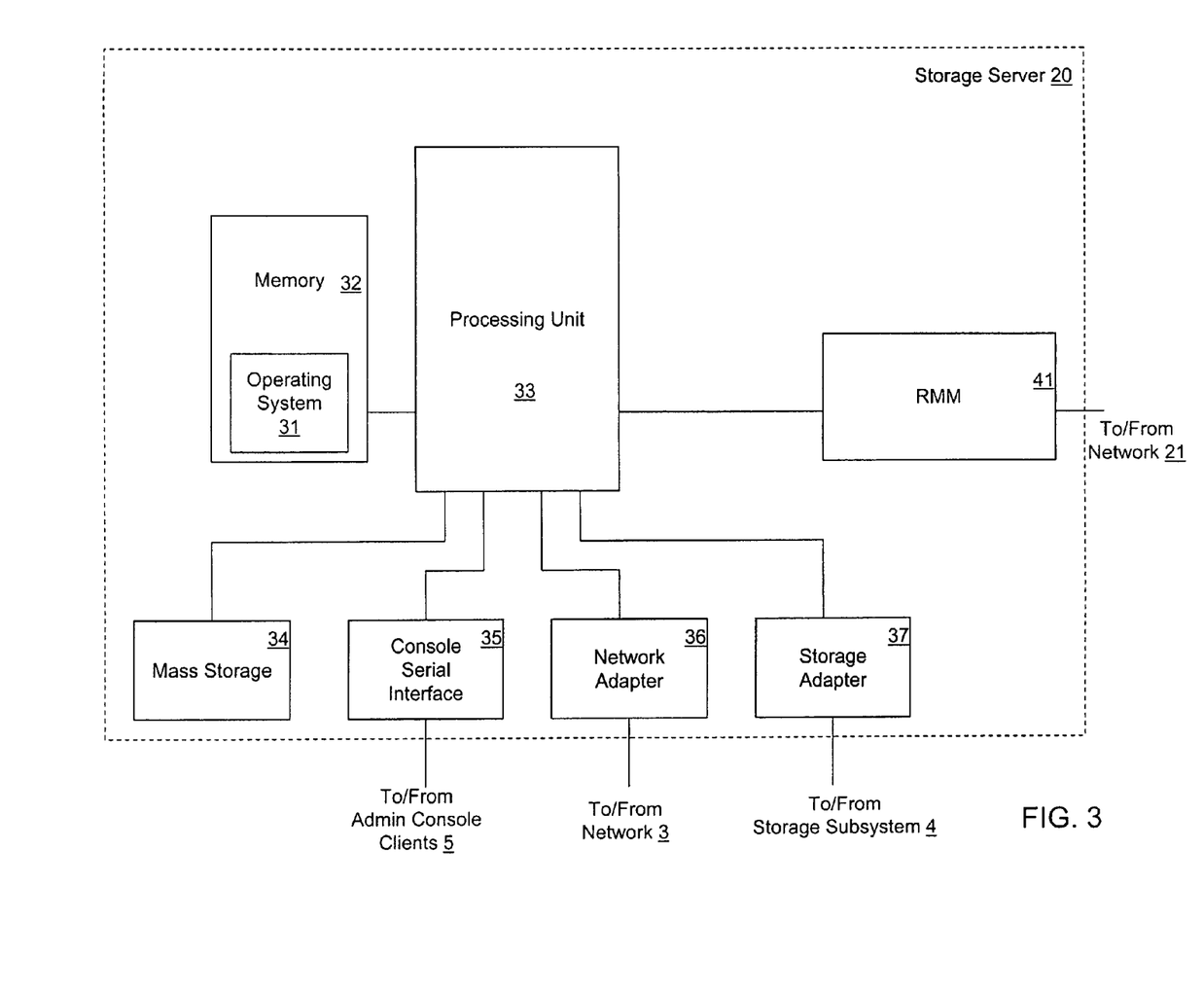
FIG. 3 is a block diagram of the storage server of FIG. 2, according to embodiments of the invention.

FIG. 3 is a high-level block diagram of the storage server 20, according to at least one embodiment of the invention. The storage server 20 may be, for example, a file server, and more particularly, may be a network attached storage (NAS) appliance (e.g., a filer). Alternatively, the storage server 20 may be a server that provides clients 1 with access to individual data blocks, as may be the case in a storage area network (SAN). Alternatively, the storage server 20 may be a device that provides clients 1 with access to data at both the file level and the block level. While embodiments of the present invention are described in the context of a storage server, other embodiments of the invention can be implemented on any appliance using a service processor. Such appliances include, but are not limited to, network caches, storage server blades, switches and routers, and generic servers.

Referring now to FIG. 3, the storage server 20 includes a processing unit 33 and memory 32, which can be coupled to each other through some bus or chipset, such as a conventional Northbridge/Southbridge combination chipset. The processing unit 33 represents the central processing unit (CPU) of the storage server 20 and may be, for example, one or more programmable general-purpose or special-purpose microprocessors or digital signal processors (DSPs), microcontrollers, application specific integrated circuits (ASICs), programmable logic devices (PLDs), or a combination of such devices.

The memory 32 may be, or may include, any of various forms of read-only memory (ROM), random access memory (RAM), Flash memory, or the like, or a combination of such devices. The memory 32 stores, among other things, the operating system 31 of the storage server 20. In one embodiment, the operating system 31 is the Data ONTAP™ operating system offered by Network Appliance. In other embodiments, the operating system 31 can be any generic operating system, or any operating system with included or enhanced storage service capabilities. The storage server may include additional memories, such as mass storage device 34. The internal mass storage device 34 may be or include any conventional medium for storing large volumes of data in a non-volatile manner, such as one or more magnetic or optical based disks.

In one embodiment, the storage server 20 also includes a console serial interface 35, a network adapter 36 and a storage adapter 37 coupled to the processing unit 33. The storage server 20 can also include redundant power supplies, various bridges, buses, controllers, and other devices not directly relevant to the present invention.

The serial interface 35 allows a direct serial connection with a local administrative console, such as console 22 in FIG. 2, and may be, for example, an RS-232 port. The storage adapter 37 allows the storage server 20 to access the storage subsystem 4 and may be, for example, a Fibre Channel adapter or a SCSI adapter. The network adapter 36 provides the storage server 20 with the ability to communicate with remote devices, such as the clients 1, over network 3 and may be, for example, an Ethernet adapter.

The storage server 20 further includes an RMM 41. The RMM provides a network interface and is used to allow a remote processing system, such as an administrative console, to control and/or perform various management functions on the storage server via network 21, which may be a LAN or a WAN, for example. The management functions may include, for example, monitoring various functions and state in the storage server 20, configuring the storage server 20, performing diagnostic functions on and debugging the storage server 20, upgrading software on the storage server 20, etc.

In one embodiment, the RMM 41 is designed to operate independently of the storage server 20. Hence, the RMM 41 runs on standby power so that it is available even when the main power to the storage server 20 is off. In certain embodiments of the invention, the RMM 41 provides diagnostic capabilities for the storage server 20 by maintaining a log of console messages that remain available even when the storage server 20 is down. The RMM 41 is designed to provide enough information to determine when and why the storage server 20 went down, even by providing log information beyond that provided by the operating system of the storage server 20. This functionality includes the ability to send a notice to the remote administrative console 22 on its own initiative, indicating that the storage server 20 is down, even when the storage server 20 is unable to do so.

Figure 4:
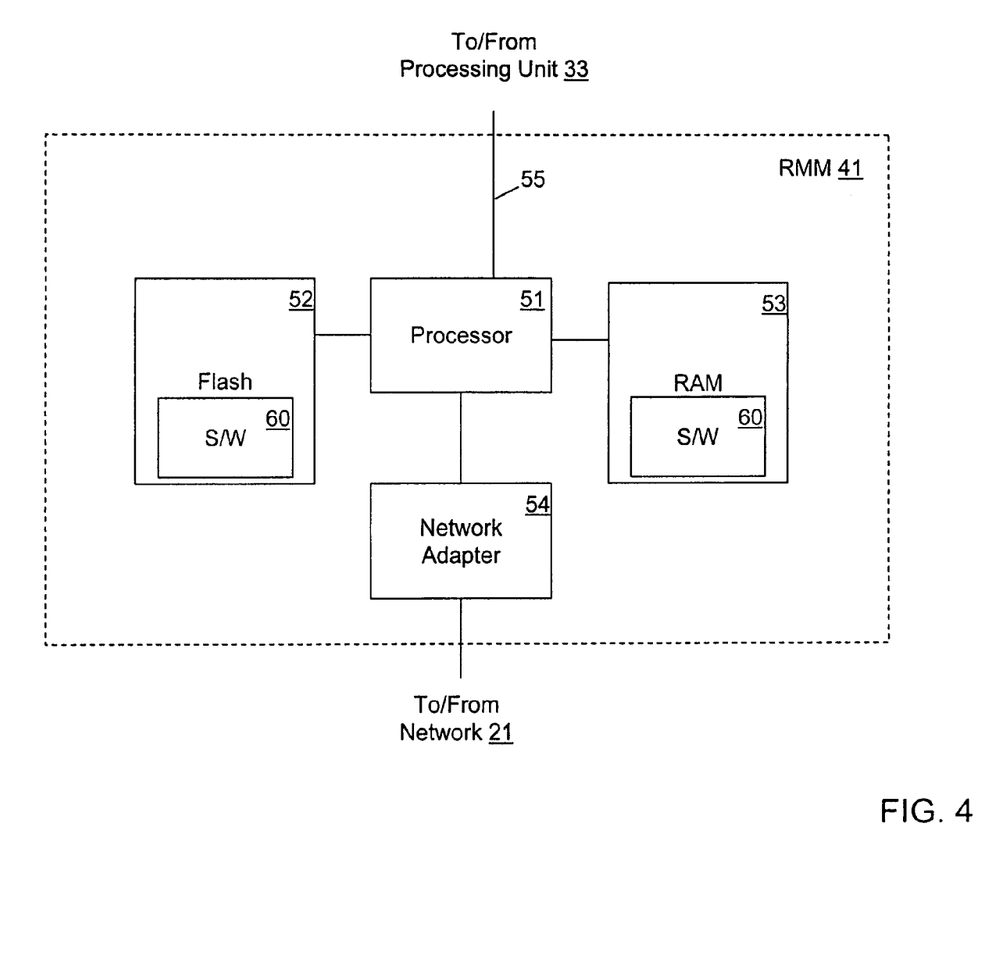
FIG. 4 is a block diagram showing components of the RMM, according to embodiments of the invention.

FIG. 4 is a high-level block diagram showing some relevant components of the RMM 41, according to certain embodiments of the invention. The various components of the RMM 41 may be implemented on a dedicated circuit card installed within the storage server. The RMM 41 includes control circuitry, such as one or more processors 51, as well as various forms of memory coupled to the processor, such as flash memory 52 and RAM 53. The RMM 41 further includes a network adapter 54 to connect the RMM 41 to the network 21. The network adapter 54 may be or may include, for example, an Ethernet (e.g., TCP/IP) adapter. Although not illustrated as such, the RMM 41 may include a chipset or other form of controller/bus structure, connecting some or all its various components.

The processor(s) 51 is/are the CPU of the RMM 41 and may be, for example, one or more programmable general-purpose or special-purpose microprocessors, DSPs, microcontrollers, ASICs, PLDs, or a combination of such devices.

Figure 5:
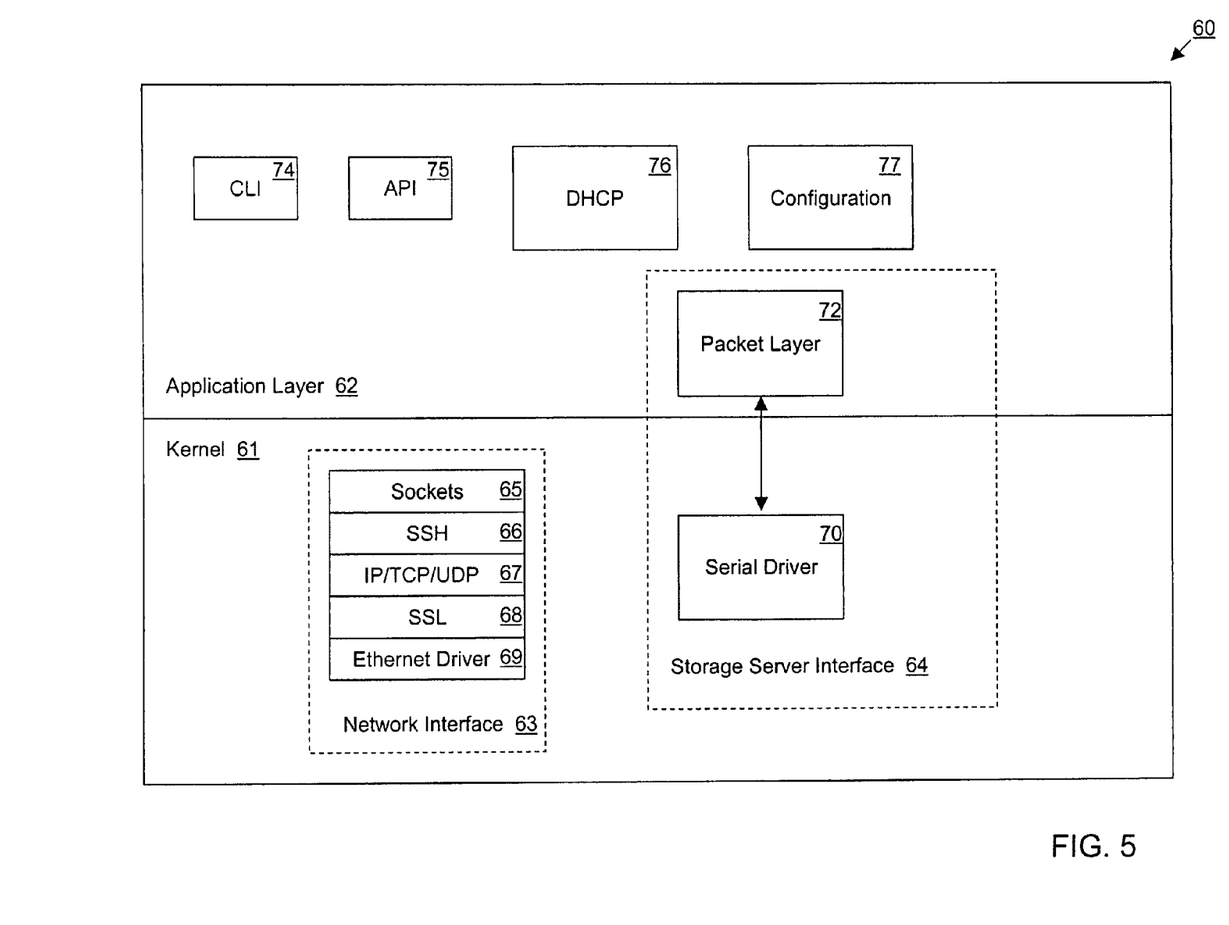
FIG. 5 is a block diagram showing the software architecture in the RMM, according to embodiments of the invention.

In at least one embodiment, the processor 51 is a conventional programmable, general-purpose microprocessor that runs software from local memory on the RMM 41 (e.g., flash 52 and/or RAM 53). FIG. 5 illustrates the relevant aspects of the software of the RMM 41, according to certain embodiments of the invention. At a high level, the software 60 of the RMM 41 has two layers, namely, an operating system kernel 61 and an application layer 62 that runs on top of the kernel 61. In certain embodiments, the kernel 61 is a Linux based kernel. The kernel 61 includes a network interface 63 to control network communications with a remote processing system, and a storage server interface 64 to control communications with the other components of the storage server 20. The network interface 63 includes a protocol stack that includes a sockets layer 65, a Secure Shell (SSH) layer 66, an IP/TCP/UDP layer 67, an SSL layer 68 and an Ethernet driver layer 69. The storage server interface 64 includes a serial driver 70, through which the RMM 41 can communicate with the operating system of the storage server 20.

The application layer 62 includes a packet layer 72, which cooperates with the serial driver 70. The packet layer 72 is responsible for converting packets received from other modules in the application layer 62 into a serial format for transmission by the serial driver 70, and for converting serial data received from the serial driver 70 into packet format for use by other modules in application layer 62.

The application layer 62 also includes: a command line interface (CLI) 74 to allow an authorized user to access functions of the RMM 41; an application programming interface (API) 75 to allow an authorized remote application to make calls to the RMM software 60; a Dynamic Host Configuration (DHCP) layer 76 to enable automatic IP address assignment; and various other configuration applications 77 to process configuration data.

Configuring the Remote Management Module

When the storage server 20 is initially brought online, it needs be configured to operate in the storage network. This is done by providing the storage server 20 with various storage server configuration parameters. Similarly, the RMM 41 also needs to be configured, by providing the RMM 41 with various RMM configuration parameters. For example, to allow for communication independent from the appliance it is monitoring, the RMM 41 needs to be initialized with an IP address. Other configuration items may include the name of the system 20 the RMM 41 is used to monitor, the RMM's serial number, gateway, and other such configuration items.

The technique introduced herein, as will now be described, enables the RMM 41 to be configured automatically when the storage server 20 itself is configured, such that the network administrator does not have to separately configure the RMM 41. One embodiment of a configuration interface (also referred to here sometimes as a user interface) that enables a configuration entity—such as a user or administrator—to simultaneously configure the host processing unit 33 of the storage server 20 and the RMM 41 is now illustrated with reference to FIG. 6. The graphical user interface shown in FIG. 6 can be implemented by the operating system 31 of the storage server 20 or an admin console 5. However, the operating system 31 ultimately implements some form of configuration interface to allow the input of configuration information. The terms user and configuration entity are used interchangeably in some portions of this description to indicate that the configuration parameters input using interface 83 can originate from a human user or administrator, or some software performing configuration either automatically, or in response to other user input.

Figure 6:
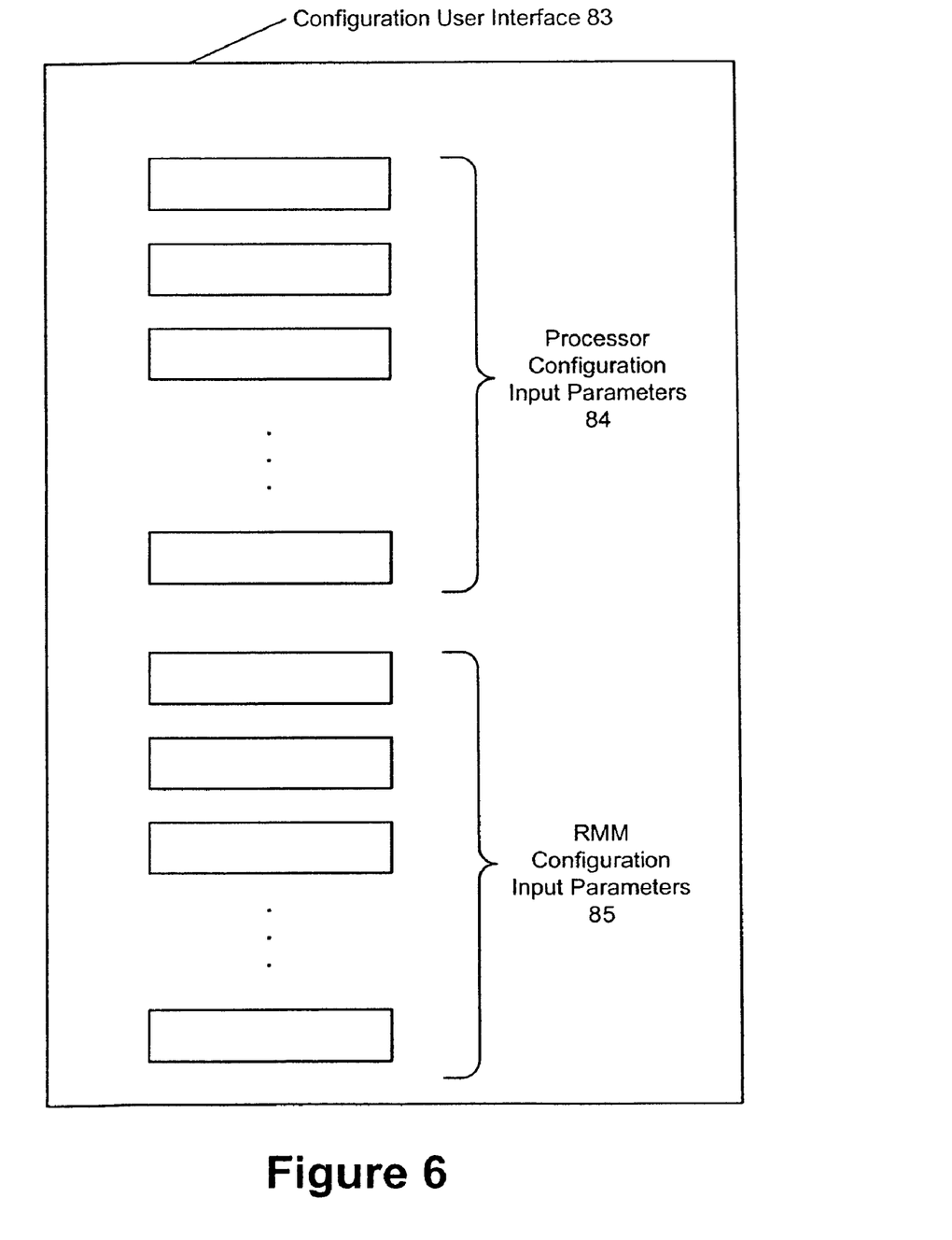
FIG. 6 is a block diagram of a user interface for configuring a system and a service processor according to embodiments of the invention.

FIG. 6 shows a simplified illustration of a graphical user interface 83 having a number of input fields to receive user input specifying storage server configuration parameters 84 and a number of input fields to receive user input specifying various RMM configuration parameters 85. In one embodiment, this user interface 83 is used when an admin console 5 or client 1 initially connects to the processing unit 33 of the storage server 20 via the console serial interface 35 or the network adapter 36.

In addition to allowing the user (e.g. an administrator) to configure the processing unit 33 and the operating system 31 running on the processing unit 33 (e.g. ONTAP), the user interface 83 allows the user to configure the RMM 41 without establishing a separate connection to the RMM 41. To accomplish this, in one embodiment, the operating system 31 running on the processing unit 33 transfers the RMM configuration input parameters 85 entered by the user to the RMM 41, i.e., without the user having to directly interact with the RMM 41.

In one embodiment, this transfer is carried out by sending the configuration information over the bus or chipset coupling the storage server 20 to the RMM 41 using the storage server interface 64 of the RMM 41 as described above with reference to FIG. 5. In a more specific embodiment, the processing unit 33 uses a multiplexed packet protocol to send the RMM configuration parameters 85 to the serial driver 70, which in turn forwards it to the packet layer 72, where the configuration information is de-multiplexed and forwarded to the appropriate applications to be used to configure the RMM 41. The storage server interface 64 that helps connect the processing unit 33 and operating system 31 to the RMM 41 and kernel 61 need not be implemented as a multiplexed or serial interface. Other communication paths and protocols, both publicly available and proprietary, may also be used to transfer the configuration data from the processing unit 33 side of the storage server 20 to the RMM 41 side.

In one embodiment, the processing unit 33 generates a configuration file from the received RMM configuration parameters 85. This file can be a tuple-file, a tuple being two items: a parameter name and a parameter value. For example, one tuple in the configuration file may be IP_ADDRESS 123.432.543.34. The configuration file is then transferred via the storage server interface 64 to the RMM 41.

The RMM configuration parameters 85 can include various configuration information, such as the IP address, netmask, gateway, DNS server of the RMM 41. In addition, an enable DHCP parameter can set the RMM 41 to use a Dynamic Host Configuration Protocol (DHCP) layer 76 implemented by the RMM 41 to automatically set the IP configuration parameters—such as those mentioned above—for the RMM 41. Various other configuration items that can be configured using the configuration user interface 83 include—but are not limited to—various alert configuration parameters such as the IP address of the Simple Mail Transfer Protocol (SMTP) mailhost to which alerts can be sent, various Simple Network Management Protocol (SNMP) configuration parameters, various security parameters such as the private key user for SSH 66 connections, and various other interface configuration items. Any configuration parameter can be entered in this manner; the present invention is not limited to any specific configuration parameters.

The configuration interface 83 shown in FIG. 6 is a simplified representation of a user interface to facilitate description. A real-world interface may include various pop-up windows, install wizards, input interfaces such as radio buttons, and other non-configuration related setup parameters.

Figure 7:
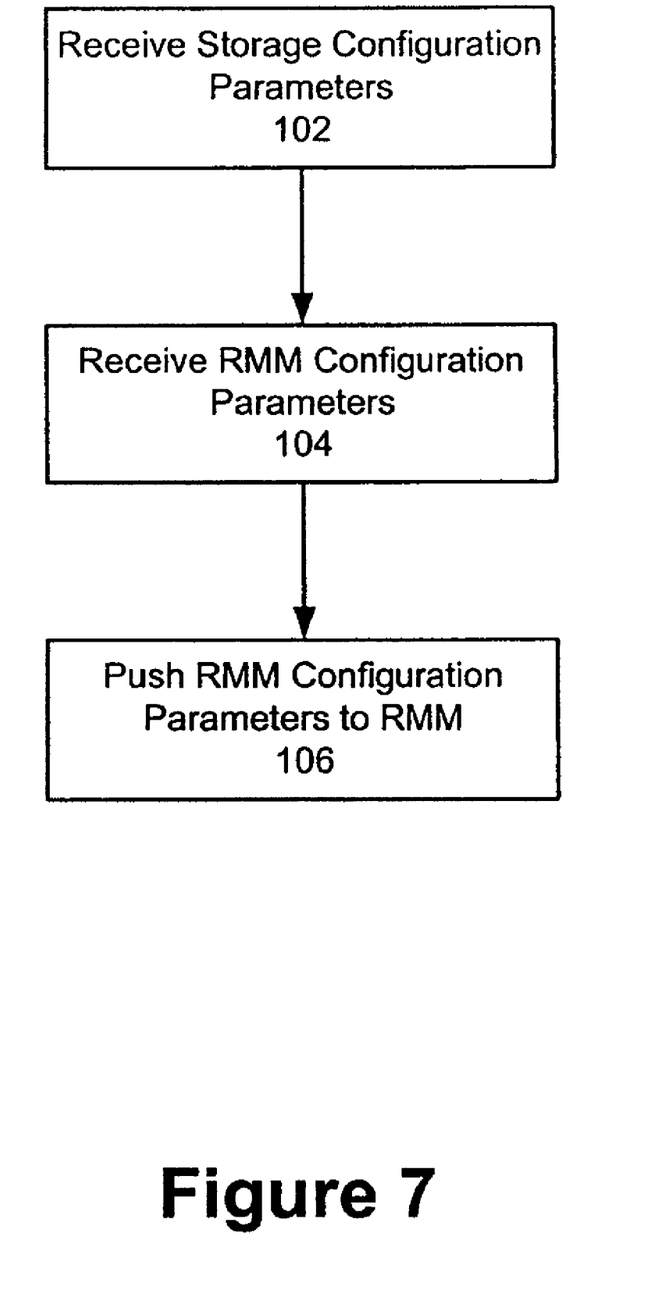
FIG. 7 is a flow diagram showing configuration processing according to embodiments of the invention.

An example of the overall process performed in the storage system 20 to configure the storage server 20 and RMM 41 is illustrated in FIG. 7. In block 102, the storage server configuration parameters are received by the storage server 20 from, for example, the administrative console 5 (see FIG. 2), where a user (e.g., network administrator) may have input them using the interface described above. In block 104, the RMM configuration parameters are also received by the storage server (i.e. the storage server processing unit 33). In one embodiment, prior to blocks 102 and 104 the RMM configuration parameters and the storage server configuration parameters were input concurrently by the user via the same user interface, such as described above in connection with FIG. 6.

In block 106, the RMM configuration parameters are pushed by the operating system 31 of the storage server 20 to the RMM 41, for example, by sending a configuration file to the RMM 41 as described above. The RMM 41 is thus configured without the user (or his administrative console) directly accessing the RMM 41.

One specific example of storage configuration input parameters 84 that may be collected by the user interface 83 in one embodiment is user credentials. User credentials can include identifying parameters, such as a user ID or name, and authentication parameters, such as a password, such as may be used to authenticate and/or authorize a network administrator to access the storage server 20 and/or the RMM 41. In one embodiment, the user credentials are also pushed to the RMM 41 via the process set forth above.

Figure 8:
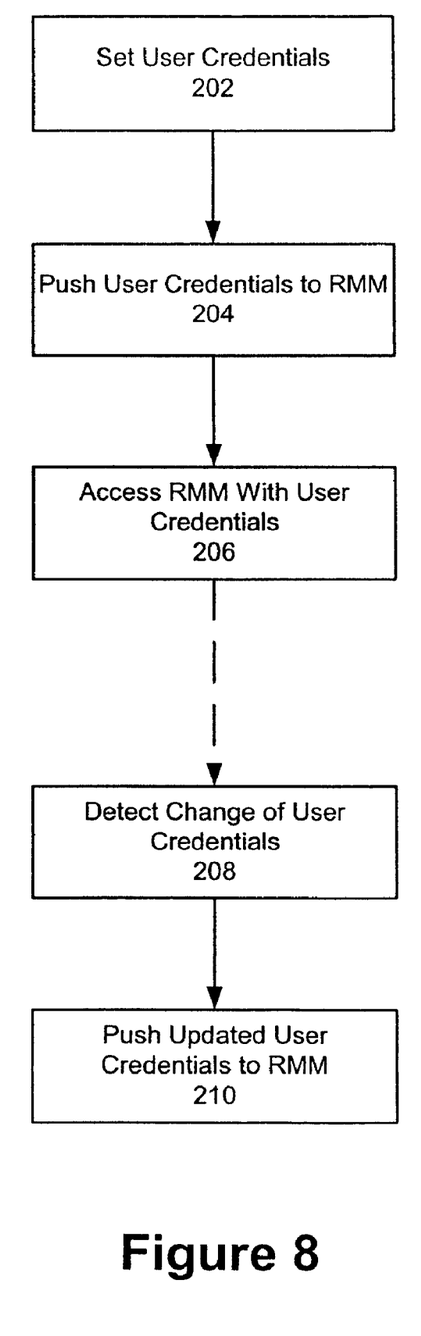
FIG. 8 is a flow diagram showing user credential synchronizing, according to embodiments of the invention.

Several embodiments of user credential processing are now described with reference to FIG. 8. In block 202, the user sets the user credentials to be used in the future to access the processing system of the storage server. In block 204, the operating system 31 pushes the user credentials to the RMM 41. In one embodiment, the processing unit 33 does this by sending the user credentials to the RMM 41 via the storage server interface 64 discussed above.

Some or all of the user credentials may be only stored in hashed form in memory 32 by processing unit 33 for security purposes. In one embodiment, only the hashed form of the user credentials is pushed to the RMM 41. However, the hash may be re-computed at the RMM 41 from the original user credentials. In one embodiment, the user credentials are stored in the RMM 41 in flash memory 52, but other types of non-volatile memory or RAM memory may be used as well.

As described above, the RMM 41 can be accessed separately from the storage server 20 via the network interface 63. In one embodiment, the user credentials used to access the storage server 20 (i.e., the processing unit 33 and operating system 31) can be used (by a network administrator, for example) to access the RMM 41 via network interface 63 and network adapter 54. This is possible because, as described above, the user credentials have been pushed to—and stored by—the RMM 41. In other words, in block 206, the RMM 41 is accessed by a user with the same user credentials used to access the storage server 20. One advantage of such user credential duplication is that the user does not need to set and remember two separate sets of credentials, i.e., one set for the storage server 20 and another set for the RMM 41.

After the passage of some time, the user credentials used to access the processing unit 33 may change; for example, a password may expire or be updated. In block 208, such a change is detected by the storage operating system 31 running on the processing unit 33. In response to such detection, in bock 210, the updated user credentials are pushed by the operating system 31 to the RMM 41 to synchronize the user credentials once again with those on the storage server 20.

Certain credential update procedures can be implemented by the operating system 31 to keep the user credentials stored in the RMM 41 up to date. For example, if a user changes the credentials (e.g. a password) to access the storage server 20, the changed credentials need to be pushed to the RMM 41 to synchronize the user credentials. The credentials update may be implemented using a special packet recognized by the packet layer 72.

In one embodiment, the RMM 41 is implemented as a Field Replaceable Unit (FRU). As such, when an RMM 41 is replaced (i.e., a service processor card is replaced), the new RMM 41 is automatically configured by the operation system 31 of the storage server 20. In one embodiment, the processing unit 33 and operating system 31 detect when a new RMM 41 is connected to the storage server 20. Upon detecting the presence of an uninitialized RMM 41 in the storage server 20, the operating system 31 provides the configuration parameters (e.g., RMM configuration parameters 85, user credentials, etc.) to the new RMM 41.

In such an embodiment, the RMM configuration parameters 85 are stored in memory 32 so that they are available for an RMM installed in the future, or if the RMM 41 were to loose its configuration data. In one embodiment, the operating system 31 of the storage server 20 maintains a configuration database for the RMM in the storage server 20 (but external to RMM). When a new (replacement) RMM is detected, the operating system 31 can use the configuration database to configure the new RMM.

In one embodiment, the processing unit 33 of the storage server 20 detects installation of a new RMM 41 in the storage server 20 by observing a change in some unique signature strings exchanged between the processing unit 33 and the RMM 41. Such signature strings identifying the RMM 41 could be inserted in all packets of a certain type, or sent periodically from the RMM 41. Furthermore, the operating system 31 can be set to automatically push relevant configuration parameters to the RMM 41 whenever the operating system 31 is restarted (i.e., when the processing unit 33 is rebooted). Thus, the RMM 41 would get proper configuration information in either a hot-swap or a switch-reboot scenario.

Thus, a method and apparatus for enabling an RMM installed in a processing system to be configured alongside the processing system have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:

receiving, in an operating system of a storage server via a first hardware interface of the storage server, system configuration parameters for configuring the storage server, wherein the system configuration parameters include a user credential for a user to access the operating system of the storage server;

receiving, in the operating system of the storage server via the first hardware interface of the storage server, RMM configuration parameters for configuring a first remote management module (RMM) of the storage server, wherein the first RMM is for monitoring the storage server, wherein the first RMM has a second hardware interface that is separate from the first hardware interface, wherein the first RMM is further for communicating with a remote administrative console through the second hardware interface, and wherein the first RMM can continuously and independently operate to communicate a monitored status of the storage server to the remote administrative console irrespective of a failure of the storage server;

causing, by the operating system of the storage server, the first RMM to be configured by pushing the RMM configuration parameters and the user credential to the first RMM;

authenticating the user for access to the first RMM based on the user credential at the first RMM;

upon detection, by the storage server, that the first RMM is uninitialized, causing the first RMM to be configured with the RMM configuration parameters and the user credential, wherein the user credential enables the user to access the first RMM; and in response to detecting that the first RMM has been swapped with a second RMM, causing, by the operating system of the storage server, the second RMM to be configured with the service configuration parameters by pushing the RMM configuration parameters and the user credential to the second RMM;

wherein the RMM is further configured to:
perform diagnostic functions on the processing system;
debug the processing system; and
upgrade software on the processing system.

2. The method of claim 1, wherein pushing the RMM configuration parameters includes generating a configuration file and transferring the configuration file from the operating system of the storage server to the first RMM.

3. The method of claim 1, further comprising storing the user credential in a nonvolatile memory of the first RMM.

4. The method of claim 1, further comprising detecting a change in the user credential used to access the storage server, and automatically updating the user credential stored in the non-volatile memory by pushing the changed user credential to the first RMM.

5. The method of claim 1, wherein the RMM configuration parameters include network access parameters, wherein the network access parameters include an IP Address, netmask, and gateway address.

6. The method of claim 5, further comprising accessing the first RMM through the second hardware interface over a network using the network access parameters.

7. A storage server comprising:
a storage processor;
a memory to store a storage operating system for execution on the storage processor;
a first remote management module (RMM) configured to run a service operating system, the first RMM including a network interface to allow access to the first RMM over a network, wherein the first RMM independently allows monitoring of the storage server over the network, and wherein the first RMM is configured to continuously and independently operate to communicate, over the network, a monitored status of the storage operating system to a remote administrative console irrespective of a failure of the storage server;
a configuration interface of the storage operating system to allow a user to input configuration data, including a user credential, used to configure the storage operating system and configure of the first RMM, wherein the configuration interface is separate from the network interface of the first RMM,
wherein, when the storage operating system detects that the first RMM is uninitialized, the storage operating system is configured to push the configuration data and the user credential to the first RMM,
wherein, when the storage operating system detects that the first RMM is swapped for a second RMM, the storage operating system is configured to push the configuration data and the user credential to the second RMM to enable access for the user to the second RMM; and
a communication interface between the storage processor and an RMM of the first and the second RMM, the communication interface operable to send a portion of the configuration data from the storage operating system to the RMM to enable the storage operating system to configure the RMM;
wherein the RMM is further configured to:
perform diagnostic functions on the processing system;
debug the processing system; and
upgrade software on the processing system.

8. The storage server of claim 7, wherein the communication interface includes a serial interface implementing a packet protocol.

9. The storage server of claim 7, wherein the storage operating system is different from the service operating system.

10. The storage server of claim 7, wherein the storage operating system sends a portion of the configuration data used to configure the first RMM to the first RMM upon boot.

11. The storage server of claim 7, wherein the memory stores a configuration database that includes the received configuration data, the configuration data including configuration parameters used to configure the first RMM.

12. The storage server of claim 11, wherein the storage operating system transmits the configuration parameters used to configure the first RMM to the second RMM upon detecting that the first RMM has been replaced swapped with the second RMM.

13. A method comprising:
receiving configuration parameters via a configuration interface of an operating system of a storage server, wherein the configuration parameters include system configuration parameters used to configure the storage server, and service configuration parameters used to configure a first remote management module (RMM) of the storage server, wherein the service configuration parameters include an IP address, netmask, and gateway for the first
RMM, wherein the system configuration parameters include a user credential to authenticate a user to the storage server,
wherein the first RMM is for monitoring the storage server, and wherein the receiving is performed via a hardware interface of the storage server separate from a network interface of the first RMM, and wherein the first RMM is configured to continuously and independently operate to communicate a monitored status of the storage server to a remote administrative console irrespective of a failure of the storage server;
sending the service configuration parameters and the user credential from the operating system to the first RMM;
upon detection by the operating system that the first RMM is uninitialized, configuring, by the operating system, the first RMM with the service configuration parameters and the user credential, wherein the user credential enables the user to access the first RMM;
upon detecting by the operating system that the first RMM has been swapped for a second RMM, configuring the second RMM with the service configuration parameters and the user credential, to enable the user access to the second RMM
wherein the RMM is further configured to:
perform diagnostic functions on the processing system;
debug the processing system; and
upgrade software on the processing system.

14. The method of claim 13, further comprising:
configuring the storage server with the system configuration parameters.

15. The method of claim 13, further comprising synchronizing the user credential by pushing an updated user credential of the storage server to the first RMM.

16. A method comprising:
generating a first user interface for receiving, via a configuration interface, system configuration parameters used to configure a processing system, wherein the system configuration parameters include a user credential to authenticate a user to the processing system;

generating a second user interface for receiving, via the configuration interface, service configuration parameters used to configure a first remote management module (RMM) of the processing system, the first RMM for monitoring the processing system wherein the first RMM is configured to continuously and independently operate to communicate a monitored status of the processing system to a remote administrative console irrespective of a failure of the processing system;

receiving, in the processing system, via a configuration hardware interface of the processing system separate from a monitoring hardware interface of the first RMM, the system configuration parameters from the first user interface and the service configuration parameters from the second user interface;

configuring, by the processing system, the first RMM with the service configuration parameters and the user credential without access by the user to the first RMM via the monitoring hardware interface, wherein the user credential enables the user to access the first RMM;

upon detection, by the processing system, that the first RMM has been swapped with a second RMM, configuring the second RMM with the service configuration parameters and the user credential to enable the user to access the second RMM wherein the RMM is further configured to:
perform diagnostic functions on the processing system;
debug the processing system; and
upgrade software on the processing system.

17. A non-transitory machine-readable storage medium having stored therein a set of instructions which, when executed by a processor of a processing system, cause the processing system to:

generate a configuration interface including:

a set of system configuration fields to allow a configuration entity to input to the processing system, through a first hardware interface, system configuration parameters for configuring the processing system, the system configuration parameters including a user credential to authenticate a user to the processing system; and a set of remote management module (RMM) configuration fields to allow the configuration entity to input, through the first hardware interface, RMM configuration parameters for configuring a first RMM coupled with the processing system, wherein the first RMM includes a second hardware interface that is separate from the first hardware interface, and wherein the first RMM is configured to: monitor functions and state of the processing system and continuously and independently communicate a monitored status of the processing system to a remote administrative console through the second hardware interface irrespective of a failure of the processing system;

receive via the configuration interface the system configuration parameters;

receive via the configuration interface the RMM configuration parameters;

configure the processing system utilizing the system configuration parameters;

and cause the first RMM to be configured with the RMM configuration parameters and the user credential; and in response to detecting that the first RMM has been swapped for a second RMM, cause the second RMM to be configured with the RMM configuration parameters and the user credential;

wherein the RMM is further configured to:
perform diagnostic functions on the processing system;
debug the processing system; and
upgrade software on the processing system.

18. The non-transitory machine-readable storage medium of claim 17, wherein the processing system includes a storage server.

19. The non-transitory machine-readable storage medium of claim 17, wherein the failure of the processing system is a power failure.

20. The non-transitory machine-readable storage medium of claim 19, wherein, upon the failure of the processing system, the first RMM issues a notification, via the second hardware interface, to the remote administrative console.

* * * * *